May 15, 1956     E. A. GLYNN     2,745,137
MOLD FOR RETREADING TIRES Filed May 9, 1952     7 Sheets-Sheet 1

Fig. 1

INVENTOR
Edwin A. Glynn
BY
ATTYS

INVENTOR
*Edwin A. Glynn*

BY [signature]
ATTORNEYS

May 15, 1956  E. A. GLYNN  2,745,137
MOLD FOR RETREADING TIRES
Filed May 9, 1952  7 Sheets-Sheet 6

INVENTOR
Edwin A. Glynn
BY
ATTYS

United States Patent Office 2,745,137
Patented May 15, 1956

2,745,137

MOLD FOR RETREADING TIRES

Edwin A. Glynn, Lodi, Calif., assignor to Super Mold Corporation of California, Lodi, Calif., a corporation of California Application May 9, 1952, Serial No. 286,905

8 Claims. (Cl. 18—18)

This invention relates generally to a vulcanizing mold for applying a retread to a worn tire; the mold being especially designed, but not limited, for use in connection with the retreading of extremely large tires such as are used on earth moving equipment.

"Retreading," as the term is used herein, is intended to include tire tread replacement by what is known as "recapping."

A major object of the present invention is to provide a tire retreading mold, of generally the clam-shell type, which comprises a novel adjustable structural combination adapted to accommodate—with interchangeable matrices—tires of different diameters and cross sections.

Another object of this invention is to provide a tire retreading mold which is capable of ready and convenient use, with tires which are large, heavy, and stiff, and thus otherwise difficult to handle and manipulate for retreading operations; the mold, when in use, maintaining the tire in proper position and then effectively vulcanizing a straight even tread thereon.

A further object of this invention is to provide a tire retreading mold which embodies an improved heating system for the tire engaging matrix assembly; the crown of the matrices being directly heated by steam pipes cast into said matrices, while the side skirts of the latter are supplementarily heated, by conduction, by steam-chambered platens between which the matrix assembly is clamped when the mold is in use.

An additional object of the instant invention is to provide a tire retreading mold which includes a novel mechanism for securing the upper and lower mold body sections in forceful clamping engagement with the matrix assembly which is disposed therebetween; such mechanism including a quick-releasable center screw extending between the body sections, and there being safety means to prevent inflation of the tire in the mold until said center screw is secured.

A still further object is to provide a tire retreading mold, of clamshell type, which opens wide, thus permitting the use of an overhead hoist or crane for placing a tire in, or removing the same from, the mold.

It is also an object of the invention to provide a tire retreading mold which is designed for fast, safe, and easy operation.

Still another object of the invention is to provide a practical, reliable, and durable tire retreading mold, and one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the improved tire retreading mold is of generally clamshell type, and includes an upper, circular body section 1, and a lower, circular body section 2; said sections being formed top and bottom, respectively, with reinforcing webs, indicated at 3 and 4.

The lower body section 2 is supported, above the floor, by a plurality of circumferentially spaced legs 5, which legs are clear of the central portion of said body section 2, for the purpose which will hereinafter appear.

Figure 1:
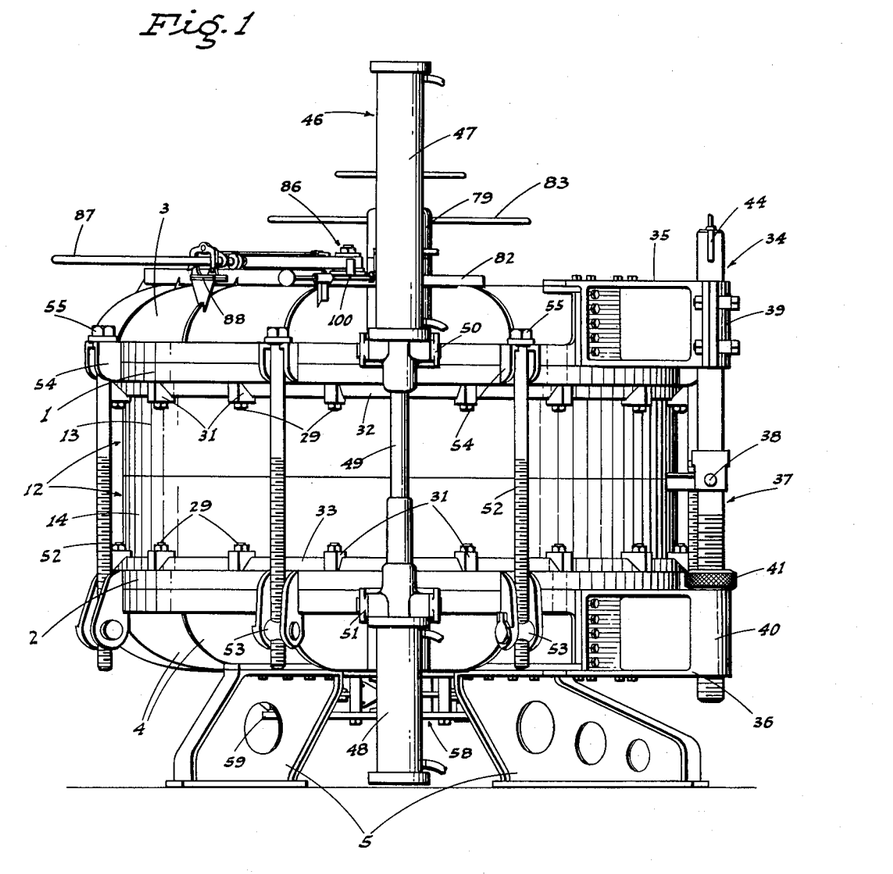
Fig. 1 is a side elevation of the tire retreading mold in closed position.
Figure 2:
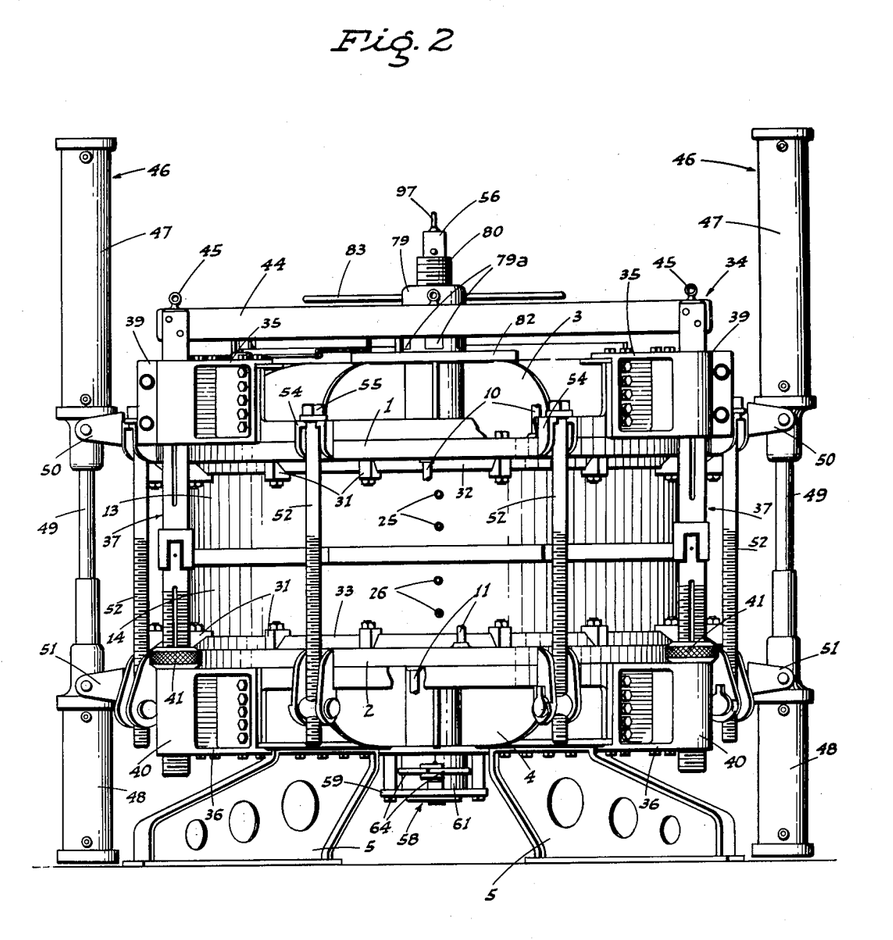
Fig. 2 is a rear elevation of the same.
Figure 3:
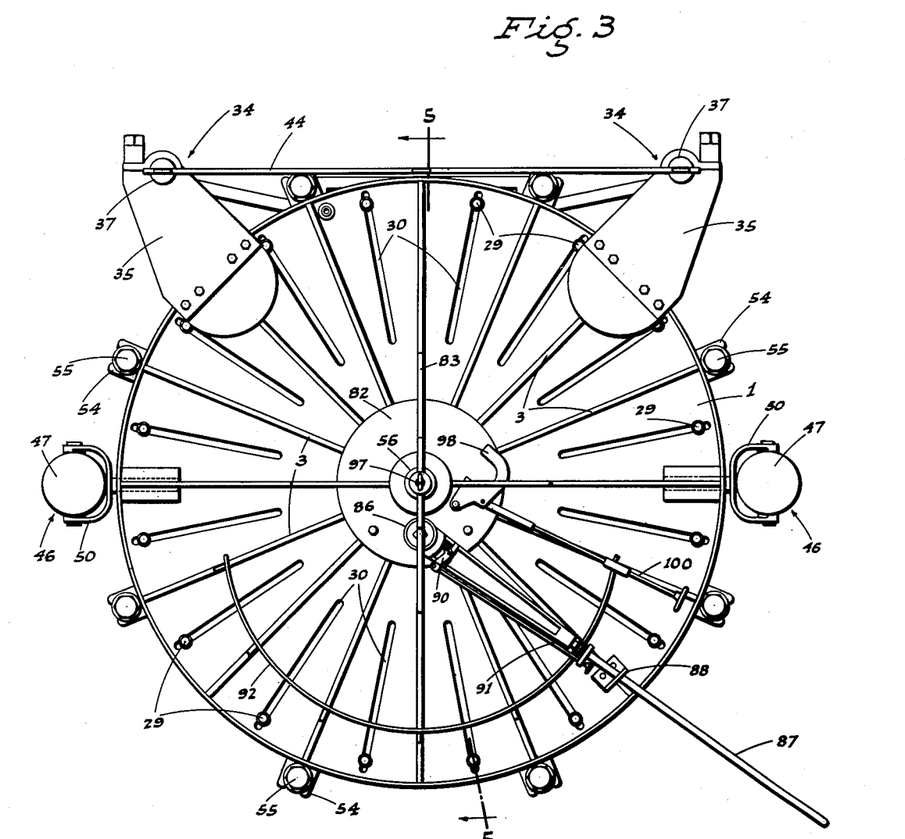
Fig. 3 is a top plan view of the tire retreading mold in closed position.
Figure 4:
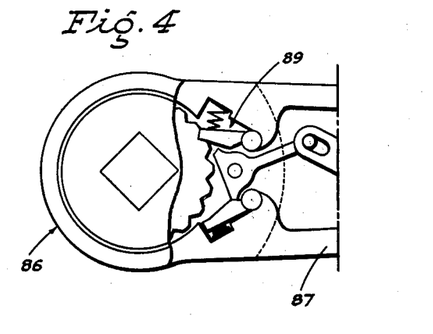
Fig. 4 is a fragmentary plan view, partly broken away, showing the lever actuated ratchet wrench.

The body sections 1 and 2 are formed, on their adjacent faces, with an upper, downwardly facing platen 6, and a lower, upwardly facing platen 7, which platens are backed—within the corresponding body sections—by steam chambers indicated at 8 and 9, respectively. These steam chambers 8 and 9 are fed from a steam supply conduit assembly (not shown) which connects to fittings 10 and 11 on the body sections 1 and 2, respectively, at the rear thereof (see Fig. 2).

When the mold is in operation the body sections 1 and 2 are disposed in horizontal but vertically spaced relation, with a matrix assembly, indicated generally at 12, clamped between said body sections in matched face to face engagement with the platens.

The matrix assembly 12 comprises an upper, annular matrix half 13, and a lower, annular matrix half 14; the matrix halves 13 and 14, when in engagement, defining an annular concavity for the reception of the tire 15 to be retreaded, and which tire has previously had new tread rubber or camelback applied thereto in a conventional manner.

The matrix halves 13 and 14 each include a relatively long side skirt, the latter being indicated at 16 and 17, respectively, and which side skirts bear in flat or face to face engagement with the corresponding platens 6 and 7.

The tire 15 as disposed in the matrix assembly 12 is supported, at the beads, on a tire mounting rim or drum 18, with the tire beads retained by rings 19 and 20 on said drum. The assembly of the drum 18 and the rings 19 and 20 is shown in detail in copending application, Serial No. 492,666, filed March 7, 1955, entitled Tire Mounting Drum and Flange Unit.

Upper and lower annular, sub-pressure plates 21 and 22 engage the sidewalls of the tire 15 between the side skirts 16 and 17, and the tire bead retention rings 19 and 20, respectively. Thus, when the mold is closed and in operation, the tire 15 is fully confined, being inflated—to cause it to forcefully engage in the matrix assembly—by means of a tube 23 in such tire.

The crown of the matrix assembly 12 is effectively heated by a course of helically wound pipes 24 cast in each matrix half. Steam is supplied to each of the cast-in pipes 24 by the same conduit system (not shown) which supplies steam to the chambers 8 and 9; such system being coupled to fittings 25 and 26 on the rear of the matrix halves 13 and 14, respectively.

The steam fed through the cast-in pipes 24 directly heats the crown of the matrix assembly, while the side skirts 16 and 17 are supplementarily heated by conduction from the steam chambers 8 and 9, respectively. Thus, the mold is not only effective to properly vulcanize the new tread, but is also useful to cure both spot repairs and sections on the sidewalls during the same curing period.

The matrix halves 13 and 14 are formed, interiorly at the crown, with suitable tread design ribs 27; such matrix halves being supplied in different sizes whereby to accommodate tires having varying diameters and cross sectional dimensions.

Figures 9, 10, 11:
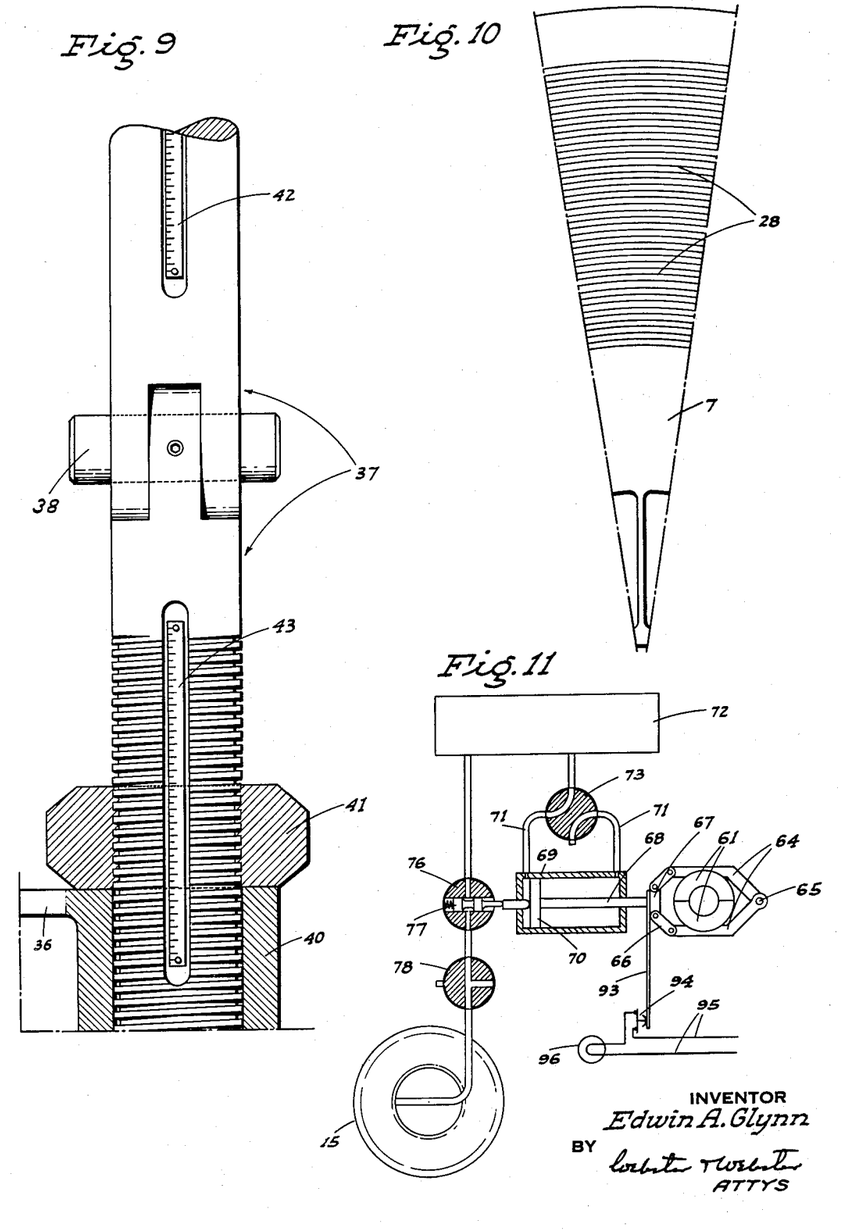
Fig. 9 is an enlarged fragmentary rear elevation of one of the hinge posts, with the adjustable supporting nut thereon.
Fig. 10 is a segmental plan view of one of the platens, showing the concentric guide lines thereon.
Fig. 11 is a diagram of the control circuit for the center screw locking device.

The matrix halves 13 and 14 are disposed in exact centered position on the platens 6 and 7; the latter having concentric guide lines 28 scribed thereon for this purpose. When properly located, the matrix halves 13 and 14 are clamped to the platens 6 and 7 by bolts 29 which extend through radial slots 30 in the corresponding body section; said bolts 29 extending through securing dogs 31 formed with a lip engaging against projecting annular flanges 32 and 33 formed integral with said matrix halves. Thus, whether the mold be closed or open, the matrix halves 13 and 14 remain rigidly secured to the corresponding body section of said mold.

The body sections 1 and 2 are adjustably hinged together, for relative opening and closing movement, as follows:

A hinge unit, indicated generally at 34, connects the upper and lower body sections 1 and 2, and such hinge unit includes circumferentially spaced, generally radially outwardly projecting, upper mounting ears 35 on the body section 1, and vertically alined, corresponding mounting ears 36 on the body section 2.

A hinge post 37 is engaged with, and extends between, each set of mounting ears 35 and 36; each such post 37 being articulated, intermediate its ends, by means including a hinge pivot 38 having a horizontal transverse axis.

Each hinge post 37 is vertically adjustably secured at the top portion in an upper clamping sleeve 39 included in the corresponding mounting ear 35, while the bottom portion of each such post extends in sliding relation downwardly through a lower sleeve 40 included in the related lower mounting ear 36. The bottom portion of each post 37 has an adjustment nut 41 threaded thereon, which nut rests on the upper end of the corresponding sleeve 40 when the mold is open.

When the mold is adjusted for use, the hinge pivots 38 are in alinement and lie in substantially the same horizontal plane as the center line of engagement of the upper and lower matrix halves 13 and 14, respectively. Additionally, the clamping sleeves 39 are adjusted on the top portions of such posts 37, and the lower portions of such posts are adjusted by the nuts 41 so that the spacing between the platens 6 and 7 is just sufficient to receive the matrix assembly 12 therebetween when the mold is closed with the body sections 1 and 2 in horizontal, parallel relation. To aid in the accomplishment of such preadjustment of the mold, each post 37 is formed—in the upper and lower portions thereof—with longitudinal scales 42 and 43 which are read on the lower ends of the sleeves 39 and top of the nuts 41, respectively.

Because the mold is of large size and the described hinge unit weighty in the parts thereof, the posts 37 are connected at the top by a cross bar 44 for adjustment in unison, and each such post includes, at the top, a lifting eye 45. A hoist or crane (not shown) is attached to the lifting eyes 45 with a common suspension whereby such hoist or crane may be used to aid in adjustment of the hinge unit.

With the above arrangement, it is possible to readily and accurately pre-adjust the hinge unit 34 for a known size of matrix assembly 12 to be used in the subsequent tire retreading operation.

The hinged-together mold sections 1 and 2 are moved between open and closed positions by the following mechanism.

Dual power cylinder units 46 upstand at opposite sides of the mold; each such unit including an upper power cylinder 47, a lower power cylinder 48, and a common piston rod 49 connecting the same. The upper power cylinders 47 are attached to the body section 1 on opposite sides by swivel connections 50, while the lower power cylinders 48 are connected to the body section 2 on opposite sides by swivel connections 51.

The dual power cylinder units 46 are controlled by a valve-regulated, fluid pressure supply conduit system (not shown) which is operative to effect simultaneous operation of the units 46—with the cylinders 47 and 48 working in opposition—to cause expansion or contraction of said units 46 whereby to open or close the mold, respectively.

When the mold is closed, and preparatory to its use, the body sections 1 and 2 are locked together, with the matrix assembly clamped therebetween, as follows:

A plurality of mold locking bolts 52 extend all about the same in circumferentially spaced relation; such bolts being threaded, at their lower portions, through pivotally mounted nuts 53 attached to the body section 2; the bolts 52 at their upper end portions engaging in outwardly opening cradles 54 on the body section 1, with the headed upper ends 55 of the bolts bearing downward against the top of such cradles. The mold locking bolts 52 are tightened by the application of a suitable wrench to the headed upper ends 55.

Additionally, a heavy-duty center screw 56 extends axially through the mold, passing downwardly through a vertical guide 57 formed in the body section 2. Below the guide 57 the center screw 56 is quick-releasably secured against upward displacement by means of a locking device, indicated generally at 58.

Figure 7:
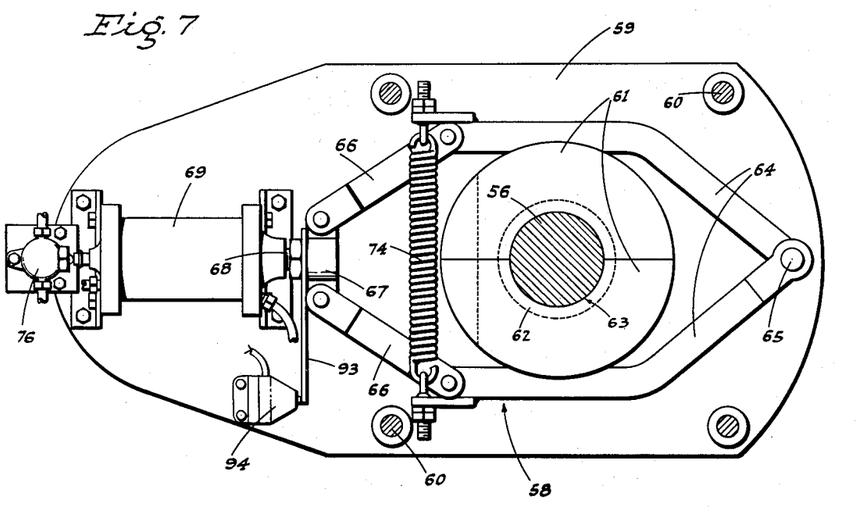
Fig. 7 is an enlarged fragmentary plan view showing the center screw locking device in closed or operative position.
Figure 8:
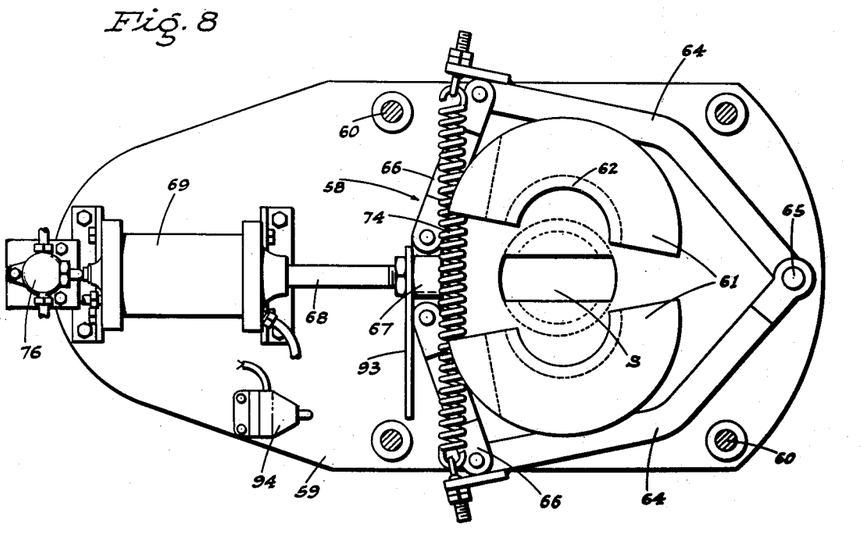
Fig. 8 is a similar view, but shows said locking device in open or released position.

The locking device 58, as shown in detail in Figs. 7 and 8, comprises a horizontal mounting plate 59 suspended below the center portion of the body section 2, and which portion is initially left clear by mounting the legs 5 as previously described; the plate 59 being carried on suspension bolts 60.

Semi-annular locking blocks 61 cooperatively engage about the center screw 56 directly above the plate 59, and such blocks have semi-annular, inwardly projecting ribs 62 which engage in corresponding annular grooves 63 in said center screw 56. The locking blocks 61 are slidably supported on the plate 59 and are of such height that they abut at the top against the bottom of the body section 2. Thus, when the locking blocks 61 encircle the center screw 56 with the ribs 62 in grooves 63, such center screw is effectively secured against upward displacement. Also, at such time, a downwardly projecting tongue T on the lower end of the center screw 56 removably engages in a socket S in plate 59; the purpose being to prevent said screw from turning when it is tightened in the manner hereinafter described.

The locking blocks 61 are adapted to be quick-opened or quick-closed as follows:

The assembly of the locking blocks 61 is straddled by scissors-linkage 64 pivoted at one end as at 65 to the plate 59, and connected at the other end by links 66 with an adjacent head 67 on the projecting end of the piston rod 68 of a fluid pressure actuated power cylinder 69 which includes a piston 70 on said rod in the cylinder. The power cylinder 69 is mounted on the plate 59 at the end opposite the pivot 65, and such cylinder—which is of double acting type—is worked in one direction or the other through the medium of a fluid pressure conduit system 71 (see Fig. 11) which couples between an air pressure tank 72 and the cylinder.

The conduit system 71 includes a manual, four-way valve 73 which is used to control the cylinder 69. The piston 70 is normally disposed in a position closing the scissors-linkage 64, which normal closure is maintained by a tension spring 74 connected between opposite sides of said scissors-linkage 64.

The following safety mechanism is associated with the locking device 58 to permit of inflation of the tire 15 only when said device is in a closed, operative position:

A conduit 75 leads from the air pressure tank 72 to the tube 23 in tire 15, and a plunger valve 76 is interposed in said conduit 75, with one end of the plunger 77 in adjacent relation to, and in direct alinement with, the end of the piston rod 68 opposite the head 67; the valve 76 being mounted on the plate 59 beyond the related end of the power cylinder 69.

The plunger 77 is spring-urged towards a valve closing position, but when the piston 70 and piston rod 68 are in position to lock the device 58, as previously described, the piston rod 68 engages a projecting end of the plunger 77, urging the latter—against the spring—to an open position whereby air may flow from tank 72 to the tire. The moment that the piston 70 and piston rod 68 begin to travel to unlock the device 58 the plunger 77 closes valve 76, thus providing an effective safety device against inflation of the tire before the mold is locked closed. The tire is deflated by venting the conduit 75 by means of a manual two-way valve 78 is said conduit 75 between the valve 76 and the tire.

The center screw, after locking by the device 58, is tightened as follows:

An elongated nut 79 engages about the threaded upper end portion 80 of the center screw 56; such nut being two-part, with upper and lower parts—as shown—normally releasably coupled together at adjacent ends by a castellated connection 79a.

The upper part of the nut 79 is threaded onto the portion 80 of the center screw 56, while the lower part of said nut, which is not threaded on such screw, is formed with a gear 81. The gear 81 is rotatably supported in a gear housing 82 centrally on the upper body section 1; such gear housing 82, while permitting of rotation of the gear 81, preventing axial shifting of the same and the lower part of said two-part nut 79.

Initial tightening of the nut 79 is accomplished manually by means of radial handles 83 which project from the upper part of the nut 79 above the housing 82.

However, final tightening of the nut 79 is accomplished by power increasing mechanism which includes a pinion 84 carried on a vertical spindle 85 in the gear housing 82, with such pinion 84 in mesh with the gear 81. At its upper end the spindle 85 projects out of the gear housing 82 and is there squared.

A box-type ratchet wrench 86 is secured on said squared end of the spindle 85, and such wrench is provided with an elongated radial lever arm 87 which extends some distance beyond the periphery of the mold; such lever arm normally being releasably supported in a retainer or holder 88 on top of the mold section 1. The ratchet wrench 86 includes reversible ratchet mechanism, indicated generally at 89, and which mechanism is controlled by a swingable lever 90 actuated by a pull rod 91 which extends alongside the lever 87 for a portion of its length.

For the final tightening of the nut 79 the lever arm 87 is released from the holder 88, and is then swung to and fro about an arcuate path of something less than 90° extent; the lever 87 as so actuated being supported by an arcuate horizontal guide rail 92 on the body section 1.

As the lever arm 87 is so worked to and fro, the ratchet mechanism 89 acts to impart turning motion to the spindle 85 and pinion 84 in a direction to rotate the gear 81 in a nut tightening direction. In this manner very great tightening of said nut 79 can be accomplished whereby to impart a tension to the center screw 56 which effectively clamps the center portions of the body sections 1 and 2 onto the matrix assembly 12.

Thus, with the mold locking bolts 52 and the center screw 56 all tightened, the mold is ready for the vulcanizing operation, which operation is carried forward with the matrix assembly 12 heated, as previously described.

The effective clamping of the body sections 1 and 2— i. e., platens 6 and 7—against corresponding faces of the matrix assembly 12, finds no interference from the hinge unit 34; this for the reason that the hinge posts 37 engage at their lower portions in slidable relation in the lower sleeves 40. The nuts 41 are preferably set so that they do not impart any downward thrust on the lower sleeves 40 when the matrix assembly 12 is forcefully clamped between the body sections 1 and 2. When the mold is in open position, as in Fig. 6, the nuts 41 do bear forcefully against the upper ends of said sleeves 40.

After the retread vulcanizing operation is complete the tire is deflated; the mold locking bolts 52 are released and swung outwardly away from the body section 1; the nut 79 is loosened by working the lever arm 87 to and fro after a reverse setting of the ratchet mechanism 89; and finally the locking device 58 is opened to free the center screw 56. When the locking device 58 is so opened, an arm 93 which projects laterally from the head 67 causes opening of a switch 94 in the energizing circuit 95 of a signal light 96, deenergizing the latter. Thus, the signal light 96 is energized when the locking device 58 is closed, and deenergized when it is open; the operator being instructed to inflate the tire only when such signal light is "on."

After loosening and release of the mold locking bolts 52 and the center screw 56, a hoist or crane is hooked to a lifting eye 97 on the upper end of said screw 56, and the latter is pulled upwardly, sliding clear of the vertical guide 57 in the body section 2 and continuing upwardly until only its lower portion is within the upper body section 1. At this time a swingably mounted, generally C-shaped, screw supporting plate 98, which is pivoted atop the housing 82, is swung inwardly from a normal clearance position and engages in an annular groove 99 in the adjacent portion of the screw 56, whereby to thus maintain the center screw 56 in a raised position for subsequent opening of the mold, and after the hoist or crane is detached from the lifting eye 97. When the center screw 56 is so raised, the upper portion of the nut 79 uncouples from the lower portion, at the castellated connection 79a, and moves upward with the screw. The screw supporting plate 98 is moved between its non-working and working positions by means of a control rod 100.

Figure 5:
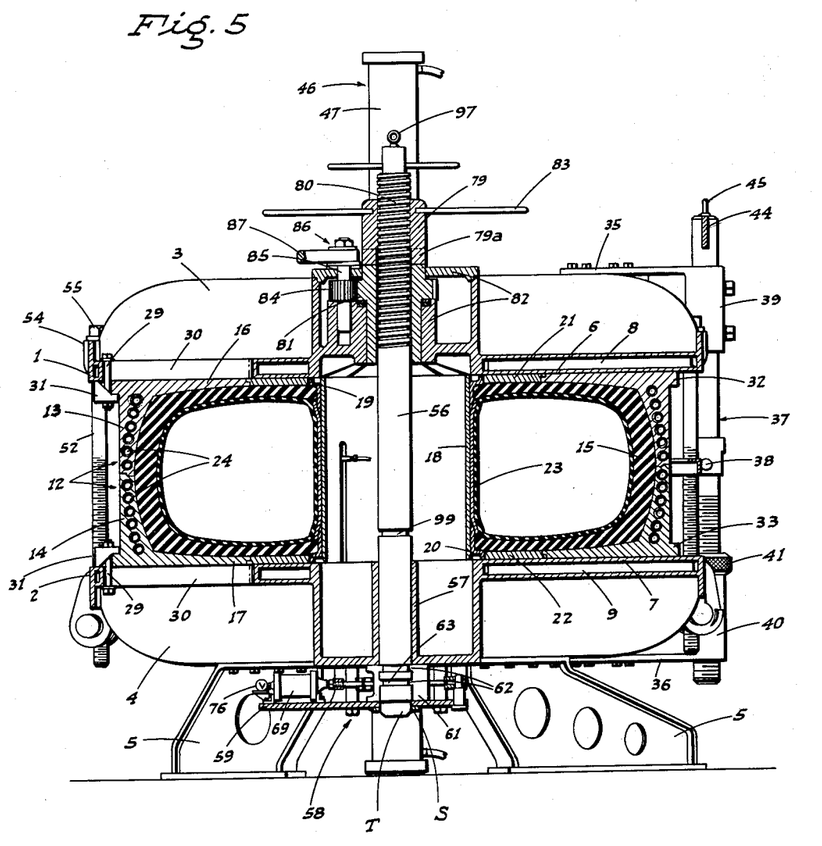
Fig. 5 is a sectional elevation of the tire retreading mold taken on line 5—5 of Fig. 3; the mold being in closed position with a tire therein for vulcanization.
Figure 6:
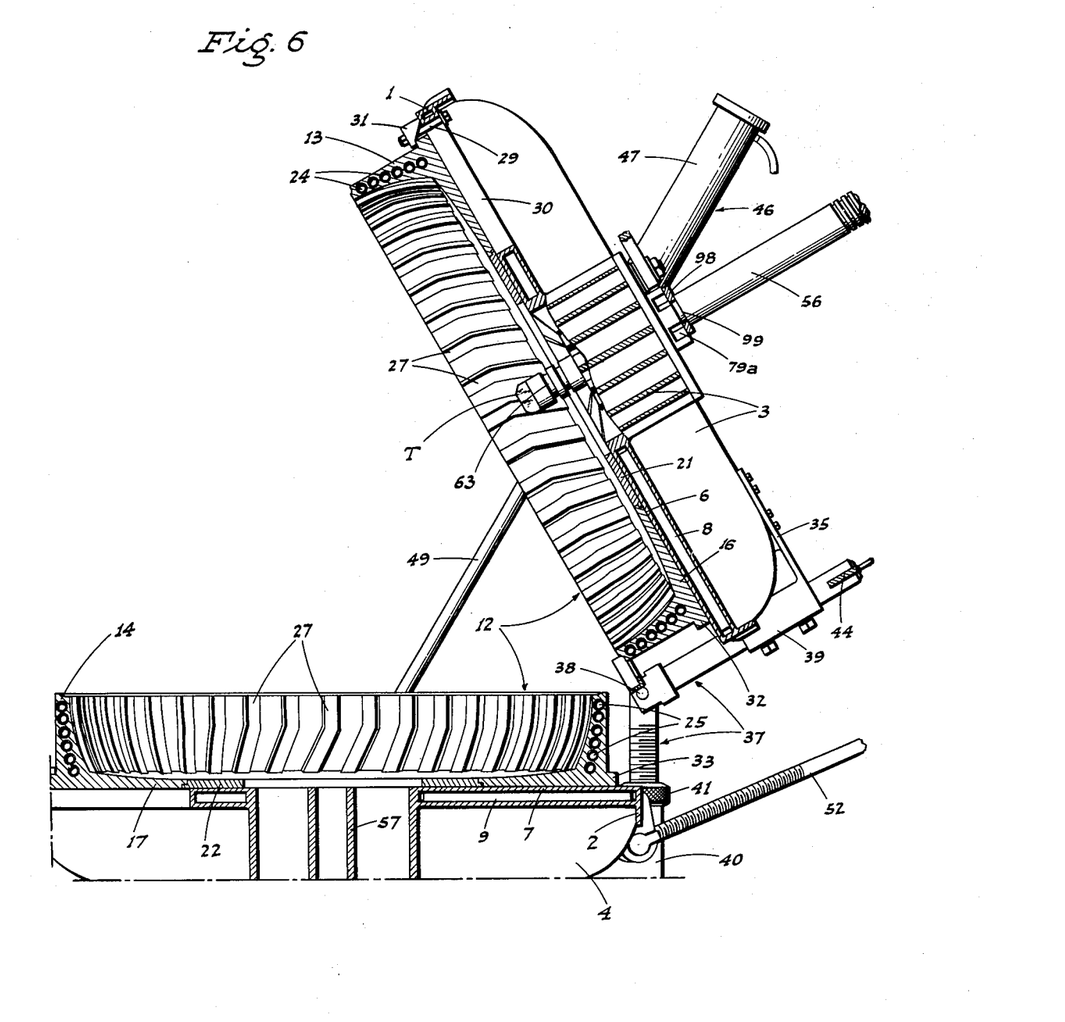
Fig. 6 is a similar view, but shows the mold open and with the tire removed.

After the mold sections are unlocked, including raising of the center screw 56, the upper body section 1 is swung by the dual power cylinder units 46 from a closed position, as in Fig. 5, to an open position, as in Fig. 6; the tire 15, with the tire mounting drum 18, remaining in the lower matrix half 14. Thereafter, the hoists or crane is employed to remove the tire 15 and such mounting drum 18 out of the mold. By reason of the fact that the mold opens relatively wide, as in Fig. 6, removal of the tire is facilitated.

The preferred steps of the method of placing the tire in, and removing the same from, the mold is described in copending application entitled Method of Placing a Tire in and Removing Same from a Mold, Serial No. 283,416, filed April 21, 1952, now Patent No. 2,639,466.

With the described mold, vehicle tires—especially the large or giant size used on earth moving equipment—can be retreaded effectively, with the handling and curing of each tire being accomplished in a ready, relatively fast, and safe manner.

Another advantage of the mold is that by the simple expedient of providing different sized matrix assemblies, tires of varying diameter and cross section can be properly retreaded without the need of other change in the mold, saving and excepting adjustment of the hinge unit 34.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. In a tire retreading mold which includes separable upper and lower body sections, and a tire-receiving matrix assembly disposed between the sections; a hinge unit connecting the body sections for relative movement between open and closed positions, said hinge unit including a pair of circumferentially spaced sleeves projecting outwardly from the upper body section, a corresponding pair of sleeves projecting outwardly from the lower body section, the related sleeves of the pairs being alined vertically when the mold sections are closed, hinge posts articulated intermediate their ends slidably projecting into said related sleeves, vertically adjustable members on the lower portion of the posts bearing against the upper end of the lower sleeves, clamping means included with the upper sleeves to releasably grip the upper portion of the posts to maintain them fixed with said sleeves in any selected position of adjustment, the upper portions of the posts projecting above the upper sleeves, and a cross bar rigidly connecting said upper portions of the hinge posts above the upper sleeves whereby said posts may be vertically adjusted in unison.

2. A tire retreading mold including separable upper and lower body sections, a tire receiving matrix assembly mounted on and disposed between the body sections, a hinge unit connecting the body sections for relative movement between open and closed position, releasable draw means connected between the body sections to clamp the matrix assembly between the body sections when the mold is closed, and power means connected between the body sections operative to open the same upon release of the draw means; said power means including upstanding, fluid pressure actuated, dual power cylinder units disposed on opposite sides of the mold, the hinge unit being at the rear of the same; each cylinder unit including a cylinder alongside the upper body section, a cylinder alongside the lower body section, swivel connections between the cylinders and corresponding body sections, and a common piston rod extending between said upper and lower cylinders of each unit.

3. In a tire retreading mold which includes separable upper and lower body sections, and a tire-receiving matrix assembly disposed between the sections; a hinge unit connecting the body sections for relative movement between open and closed positions, a center screw extending axially through the mold, a tightener unit threaded on the screw to work against one body section but being movable axially away therefrom with the screw upon release and sliding of said screw from the other section, and means releasably locking the center screw in connection with said other body section; said locking means comprising a part movable into or out of holding engagement with the center screw, a power device mounted on said other body section operative to move such part; an air supply conduit adapted for use to inflate a tire in the mold, a valve in said conduit, and an inter-connection between said power device and the valve adapted to cause closing of the latter when said power device is actuated to move said part out of holding engagement with the center screw.

4. A tire retreading mold including separable upper and lower body sections, a tire receiving matrix assembly mounted on and disposed between the body sections, a hinge unit connecting the body sections for relative movement between open and closed positions, and releasable means connected between the body sections to clamp the matrix assembly between the body sections when the mold is closed; said means comprising a vertically movable center screw extending axially through the mold, a tightener nut threaded on the screw and normally releasably engaging the upper body section, and a releasable locking device connected between the lower body section and the center screw; said locking device comprising a horizontal platform below the central portion of the lower body section, the center screw depending to adjacent said platform when the mold is closed and having a circumferential groove therein then disposed between the platform and lower body section, complementary semiannular locking blocks between the lower body section and platform horizontally slidable on the latter between an open position clear of the screw and a locked position engaging in said groove, scissors-linkage mounted on the platform and secured in actuating relation to said locking blocks, and a fluid pressure actuated power cylinder connected in operative relation to said linkage whereby to move the locking blocks between open and closed position.

5. A tire retreading mold comprising an upper body section having a downwardly facing platen, a lower body section having an upwardly facing platen, a hinge unit connecting the body sections for relative movement between a gaped open position and a closed position with the platens in spaced but parallel relation, a tire receiving matrix assembly disposed between said platens, means to heat the matrix assembly, and releasable draw means including an upstanding center screw connected between the body sections to clamp the matrix assembly between the platens when the mold is closed; there being a releasable locking device connected between the lower body portion and the center screw, a tightener nut on the screw adjacent the top of the upper body section, said nut including an upper part threaded on the center screw and a lower part relatively slidable thereon, said lower part being rotatably but axially immovably mounted on said upper body section, a normally engaged but axially separable connection between said lower and upper parts of the nut whereby the latter part is movable upwardly with the screw upon release of said locking device, and means operative to forcefully and reversibly rotate said lower part of the nut.

6. A tire retreading mold, as in claim 5, in which said last named means includes a gear formed on said lower part of the nut, a pinion in mesh with the gear, an upstanding pinion shaft, the latter projecting above the upper body section, and a long handle ratchet wrench applied to the upper end of said pinion shaft; the handle of said wrench extending, for access, beyond the periphery of the mold.

7. A mold, as in claim 4, in which the center screw below the groove is provided with a non-circular depending tongue; the platform being provided with a non-circular opening to fittingly and removably receive the tongue when the screw-groove is engaged by the blocks.

8. A tire retreading mold, as in claim 2, in which the swivel connections are attached to the corresponding cylinders relatively close to the end thereof from which the related common piston rod projects.

References Cited in the file of this patent

UNITED STATES PATENTS

| Number | Name | Date |
|---|---|---|
| 1,825,616 | Schmidt | Sept. 29, 1931 |
| 1,876,100 | Thorsen | Sept. 6, 1932 |
| 2,046,372 | Engstrom | July 7, 1936 |
| 2,174,188 | Heintz | Sept. 26, 1939 |
| 2,308,948 | Bosomworth | Jan. 19, 1943 |
| 2,315,934 | Chambers | Apr. 6, 1943 |
| 2,429,786 | Wright | Oct. 28, 1947 |
| 2,574,171 | Collins et al. | Nov. 6, 1951 |
| 2,638,629 | Heintz | May 19, 1953 |